United States Patent
Duan et al.

(10) Patent No.: US 11,839,841 B2
(45) Date of Patent: Dec. 12, 2023

(54) ONLINE CLEANING DEVICE AND ONLINE CLEANING METHOD

(71) Applicant: SUNRUI MARINE ENVIRONMENT ENGINEERING CO., LTD., Qingdao (CN)

(72) Inventors: Dongxia Duan, Qingdao (CN); Guangzhou Liu, Qingdao (CN)

(73) Assignee: SUNRUI MARINE ENVIRONMENT ENGINEERING CO., LTD., Qingdao (CN)

(*) Notice: Subject to any disclaimer, the term of this patent is extended or adjusted under 35 U.S.C. 154(b) by 122 days.

(21) Appl. No.: 17/009,726

(22) Filed: Sep. 1, 2020

(65) Prior Publication Data

US 2020/0398196 A1 Dec. 24, 2020

Related U.S. Application Data

(62) Division of application No. 15/574,825, filed on Nov. 16, 2017, now abandoned.

(51) Int. Cl.
*B01D 29/66* (2006.01)
*B01D 35/16* (2006.01)
(Continued)

(52) U.S. Cl.
CPC ............ *B01D 29/66* (2013.01); *B01D 35/16* (2013.01); *B63J 4/002* (2013.01); *C02F 1/004* (2013.01);
(Continued)

(58) Field of Classification Search
CPC .... B01D 29/66; B01D 35/16; B01D 2201/16; B63J 4/002; C02F 1/004; C02F 2103/008; C02F 2303/16
See application file for complete search history.

(56) References Cited

U.S. PATENT DOCUMENTS

| | | | | |
|---|---|---|---|---|
| 723,977 A | * | 3/1903 | Barney | ............... B01F 33/5011 366/326.1 |
| 3,535,235 A | * | 10/1970 | Schouw | ................. B01D 24/12 210/279 |

(Continued)

FOREIGN PATENT DOCUMENTS

WO 2011/071047 A1 6/2011

*Primary Examiner* — Liam Royce
(74) *Attorney, Agent, or Firm* — Cheng-Ju Chiang

(57) ABSTRACT

The present invention discloses a cleaning liquid for a ship ballast water treatment filter, an online cleaning device and an online cleaning method. The online cleaning device comprises a filter cleaning pipeline and a cleaning liquid preparation tank located in the filter cleaning pipeline. The cleaning liquid preparation tank is provided with a cleaning liquid outlet and a cleaning liquid reinjection opening. The filter cleaning pipeline comprises a cleaning liquid injection pipeline located between the cleaning liquid outlet of the cleaning liquid preparation tank and a filter water inlet, and a cleaning liquid reinjection pipeline located between a filter water outlet and a cleaning liquid reinjection opening of the cleaning liquid preparation tank. The cleaning liquid prepared in the cleaning liquid preparation tank is injected into the filter through the cleaning liquid injection pipeline and is re-injected into the cleaning liquid preparation tank through the cleaning liquid reinjection pipeline.

13 Claims, 1 Drawing Sheet

(51) Int. Cl.
*B63J 4/00* (2006.01)
*C02F 1/00* (2023.01)
*C11D 1/14* (2006.01)
*C11D 3/04* (2006.01)
*C11D 3/20* (2006.01)
*C11D 3/28* (2006.01)
*C11D 3/30* (2006.01)
*C11D 3/37* (2006.01)
*C11D 11/00* (2006.01)
*C02F 103/00* (2006.01)

(52) U.S. Cl.
CPC .............. *C11D 1/143* (2013.01); *C11D 1/146* (2013.01); *C11D 3/042* (2013.01); *C11D 3/2086* (2013.01); *C11D 3/28* (2013.01); *C11D 3/30* (2013.01); *C11D 3/3719* (2013.01); *C11D 3/3765* (2013.01); *C11D 11/0041* (2013.01); *B01D 2201/16* (2013.01); *C02F 2103/008* (2013.01); *C02F 2303/16* (2013.01)

(56) References Cited

U.S. PATENT DOCUMENTS

| | | | | |
|---|---|---|---|---|
| 4,659,463 | A * | 4/1987 | Chandler | C02F 3/1294 |
| | | | | 210/264 |
| 4,670,150 | A * | 6/1987 | Hsiung | C02F 5/02 |
| | | | | 210/651 |
| 2012/0312757 | A1 * | 12/2012 | Ueyama | B01D 33/463 |
| | | | | 210/251 |
| 2015/0224429 | A1 * | 8/2015 | Massignani | B01D 33/463 |
| | | | | 210/247 |

* cited by examiner

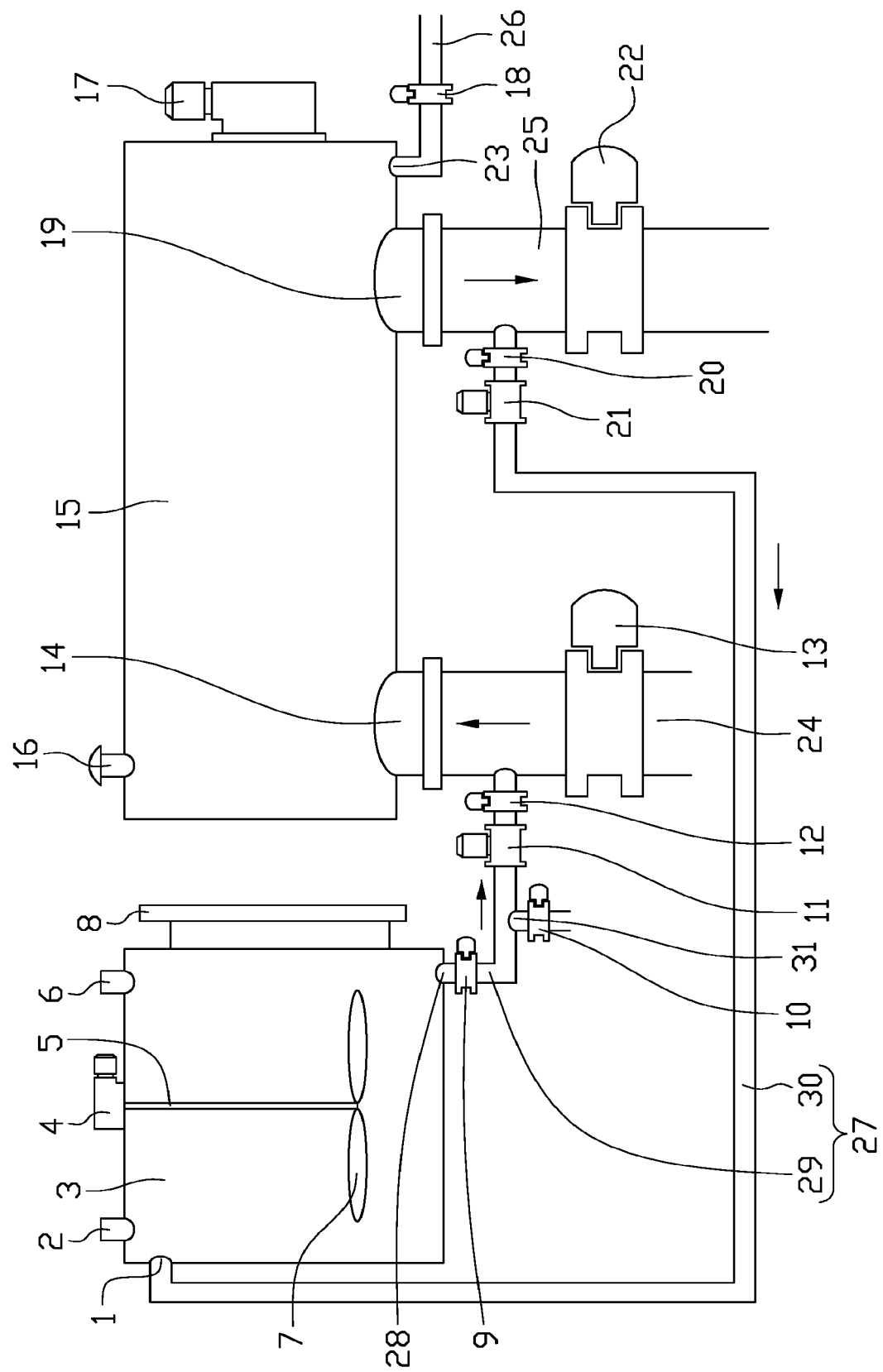

ONLINE CLEANING DEVICE AND ONLINE CLEANING METHOD

CROSS REFERENCE TO RELATED APPLICATIONS

The present application is a divisional application of Ser. No. 15/574,825 filed on Nov. 16, 2017, which is 35 U.S.C. § 371 National Phase conversion of International (PCT) Patent Application No. PCT/CN2015/079171, filed on May 18, 2015, and claims benefit of Chinese Patent Application No. 201510250934.5, filed on May 18, 2015, the disclosure of which is incorporated by reference herein. The PCT International Patent Application was filed and published in Chinese.

TECHNICAL FIELD

The present invention relates to ballast water treatment technology for ship, and more particularly to online cleaning device and online cleaning method for ship ballast water treatment filter.

BACKGROUND

During the voyage of a ship, ballasting water is necessary. When ballasting, local aquatic organisms are brought into the ballast tank and then discharged to the destination waterway with the ballast water. The ballast water, carried by the ship from one place to another, causes the spread of harmful aquatic organisms and pathogens. In order to effectively control and prevent the spread of harmful aquatic organisms and pathogens, which were caused by the ballast water of ships, International Marine Organization (IMO) passed the "International Convention for the Control and Management of Ships' Ballast Water and Sediments" in 2004. "The Convention" requires all ships to be equipped with ballast water treatment devices on schedule and is applicable retroactively to all present ships.

Ship ballast water treatment system is a kind of ship supporting equipment which is required by the international maritime organization. It is mainly used to kill organisms in the ballast water. Filtration technology is a common treatment technology used in ship ballast water management system. It is mainly used to filter biological or suspended particles which are larger than 50 um in ballast water, so as to facilitate subsequent treatment.

The existing filter for ship ballast water treatment is mostly made of stainless steel wire, and the case of the filter is made of carbon steel coated with epoxy anticorrosive coating. The meshes of the filter are fine and the diameter of the meshes is only tens of microns. It is easy to block the meshes during use. After a period of time, the filtration capacity of the filter decreases, the backwash frequency increases, and the backwash effect decreases. After disassembling the equipment, it is found that the filter mesh is blocked by sand, dirt and so on, and the surface of the filter is corroded in different degrees. In order to ensure the filtration capacity of the filter, the filter must be cleaned and regenerated. At present, the cleaning technology for ship ballast water treatment filter is scarce.

SUMMARY

Accordingly, the present invention provides an online cleaning device and online cleaning method for ship ballast water treatment filter.

The online cleaning device for ship ballast water treatment filter provided by the present invention, comprises a filter cleaning pipeline and a cleaning liquid preparation tank located in the filter cleaning pipeline. The cleaning liquid preparation tank comprises a cleaning liquid outlet and a cleaning liquid reinjection opening. The filter cleaning pipeline comprises a cleaning liquid injection pipeline arranged between the cleaning liquid outlet of the cleaning liquid preparation tank and a filter water inlet, and a cleaning liquid reinjection pipeline arranged between a filter water outlet and the cleaning liquid reinjection opening of the cleaning liquid preparation tank. The cleaning liquid prepared in the cleaning liquid preparation tank is injected into the filter via the cleaning liquid injection pipeline and re-injected into the cleaning liquid preparation tank via the cleaning liquid reinjection pipeline.

The online cleaning method for ship ballast water treatment filter provided by the present invention, includes the following steps: adding a filter cleaning pipeline and a cleaning liquid preparation tank in the ballast water main pipeline of the ship ballast water management system, the filter cleaning pipeline comprising a cleaning liquid injection pipeline and a cleaning liquid reinjection pipeline, the cleaning liquid injection pipeline being located between the cleaning liquid outlet of the cleaning liquid preparation tank and a filter water inlet, and the cleaning liquid reinjection pipeline being located between a filter water outlet and a cleaning liquid reinjection opening of the cleaning liquid preparation tank; injecting the cleaning liquid prepared in the cleaning liquid preparation tank into the filter through the cleaning liquid injection pipeline; soaking for a predetermined period of time; re-injecting the cleaning liquid back to the cleaning liquid preparation tank through the cleaning liquid reinjection pipeline.

Techniques provided in embodiments of the present invention have the following advantages:

The present invention adds the filter cleaning pipeline and the cleaning liquid preparation tank in existing ballast water main pipeline. Through the filter cleaning pipeline, the cleaning liquid prepared in the cleaning liquid preparation tank is injected into the filter and re-injected back to the cleaning liquid preparation tank after soaking for a predetermined period of time, so as to realize online cleaning filter without disassembling the filter. The cleaning method has a high cleaning efficiency and the dirt on the filter can be completely removed. The filter capacity of the filter after regeneration is recovered well.

The aforementioned description is a conceptual overview of the present invention. In order to make the technique of the present invention be clearly understood and enable in accordance with specification, and the above or other aspects, features and advantages of the present invention become apparent, embodiments and detailed descriptions in conjunction with the accompanying drawings are provided hereafter.

BRIEF DESCRIPTION OF THE DRAWINGS

The FIGURE schematically shows an online cleaning device for a ship ballast water treatment filter of the present invention.

DETAILED DESCRIPTION OF PREFERRED EMBODIMENTS

In order to further illustrate the techniques and effect of the present invention adopted for achieving the aspects, exemplary embodiments, structure, features and the effects of the cleaning liquid and online cleaning device and method for ship ballast water treatment filters according to the present invention will be described thoroughly in conjunction with the accompanying drawings and the preferred embodiments.

The foregoing or other techniques, features and effects of the present invention will become apparent in the following detailed descriptions of the preferred embodiments in conjunction with the accompanying drawings. In view of descriptions of exemplary embodiments, the techniques and effects of the present invention adopted for achieving aspects will be further and specifically understood. The accompanying drawings are merely used for illustration and description, but not used to limit the present invention.

An online cleaning device for ship ballast water treatment filter provided by the present invention is mainly used for online cleaning filters used in ship ballast water management systems. As shown in the FIGURE, a filter 15 is located in the ballast water main pipeline of the ship ballast water management system. The top of the filter 15 has a gas water separating valve 16, the bottom has a filter water inlet 14, a filter water outlet 19 and a filter sewage outfall 23. The filter water inlet 14 is connected with a filter water inlet pipe 24, the filter water outlet 19 is connected with a filter water outlet pipe 25, and the filter sewage outfall 23 is connected with a filter sewage outfall pipe 26. The filter water inlet pipe 24 and the filter water outlet pipe 25 are parts of ballast water main pipeline. The filter water inlet pipe 24, the filter outlet pipe 25 and the filter sewage outfall pipe 26 are respectively provided with a filter inlet valve 13, a filter outlet valve 22 and a filter drain valve 18 at positions close to the filter 15. The filter 15 is provided with an electric motor 17 at a position near the filter drain valve 18 for backwashing of the filter 15.

The online cleaning device of the filter provided by the present invention comprises a filter cleaning pipeline 27 and a cleaning liquid preparation tank 3 arranged in the filter cleaning pipeline 27.

Wherein, the cleaning liquid preparation tank 3 is used for preparing filter cleaning liquid. The top of the cleaning liquid preparation tank 3 is provided with a fresh water inlet 2 and a drug adding opening 6, the bottom of the cleaning liquid preparation tank 3 is provided with a cleaning liquid outlet 28, and the upper side corner is provided with a cleaning liquid reinjection opening 1. Moreover, one side of the cleaning liquid preparation tank 3 is provided with a liquid level gauge 8 configured for monitoring and controlling the liquid level in the cleaning liquid preparation tank 3. In addition, the top of the cleaning liquid preparation tank 3 is further equipped with a stirring electric motor 4, and a stirring shaft 5 and stirring blades 7 connecting with the stirring electric motor 4, the stirring shaft 5 and the stirring blades 7 extending into the cleaning liquid preparation tank 3 in order to stir the liquid in the tank 3 in the process of preparation of the cleaning liquid so that the added drugs can be mixed evenly quickly.

The cleaning liquid prepared in the cleaning liquid preparation tank 3 comprises hydrochloric acid, hexamethylene tetramine, polyacrylic acid, polyaspartic acid, sodium dodecyl sulfate and sodium gluconate. The cleaning liquid can react with dirt on the mesh of the filter without damaging the mesh. In preparing the cleaning liquid, the added drugs are solid except that hydrochloric acid is liquid. In preparing the cleaning liquid, the added drugs dissolve into a certain amount of fresh water which is then stirred evenly, and the required cleaning liquid can be obtained. Specifically, in the cleaning liquid of this embodiment, the molar concentration of hydrochloric acid is 3.2-6.4 mol/L, the quantity-to-volume ratio of the hexamethylene tetramine is 1.3-4.0 g/L, the quantity-to-volume ratio of polyacrylic acid is 13.0-33.5 g/L, the quantity-to-volume ratio of the polyaspartic acid is 3.0-13.5 g/L, the quantity-to-volume ratio of sodium dodecyl sulfate is 0.6-2.0 g/L, and the quantity-to-volume ratio of sodium gluconate is 3.0-10.0 g/L.

The filter cleaning pipeline 27 comprises a cleaning liquid injection pipeline 29 arranged between the cleaning liquid outlet 28 of the cleaning liquid preparation tank 3 and the filter water inlet 14, and a cleaning liquid reinjection pipeline 30 arranged between the filter water outlet 19 and the cleaning liquid reinjection opening 1 of the cleaning liquid preparation tank 3. Two ends of the cleaning liquid injection pipeline 29 are respectively connected with the cleaning liquid outlet 28 of the cleaning liquid preparation tank 3 and the filter water inlet pipe 24, and the connection between the cleaning liquid injection pipe 29 and the filter water inlet pipe 24 is located at downstream of the filter water inlet valve 13. Two ends of the cleaning liquid reinjection pipeline 30 are respectively connected with the filter water outlet pipe 25 and the cleaning liquid rejection opening 1 of the cleaning liquid preparation tank 3, and the connection between the cleaning liquid reinjection pipeline 30 and the filter water outlet pipe 25 is located at the upstream of the water outlet valve 22. It should be noted that the upstream and downstream are relative to the direction of water flow in the filter water inlet pipe 24 and the filter water outlet pipe 25. The cleaning liquid prepared in the cleaning liquid preparation tank 3 can be injected into the filter 15 through the cleaning liquid injection pipeline 29, and can be re-injected back into the cleaning liquid preparation tank 3 by the cleaning liquid reinjection pipeline 30.

In addition, the cleaning liquid injection pipeline 29 is provided with a valve 12 at a location near the filter water inlet pipe 24, and a valve 9 at a location close to the cleaning liquid preparation tank 3. A water pump 11 is arranged between the valve 9 and the valve 12, a backwash water injection pipe 31 is arranged between the valve 9 and the water pump 11, and the backwash water injection pipe 31 is provided with a backwash water injection valve 10. A valve 20 and a water pump 21 are provided at positions of the cleaning liquid reinjection pipeline 30 near the filter water outlet pipe 25. The valve 9, valve 12 and water pump 11 are opened in the process of injecting the cleaning liquid into the filter 15, so that the cleaning liquid is injected into the filter 15 under the driving of the water pump 11. The valve 20 and the water pump 21 are opened in the process of the cleaning liquid being re-injected into the cleaning liquid preparation tank 3, so that the cleaning liquid is re-injected back to the cleaning liquid preparation tank 3 under the action of the water pump 21. The backwash water injection valve 10, valve 12 and water pump 11 are opened after the cleaning liquid is re-injected back to the cleaning liquid injection preparation tank 3. After the backwash water injection valve 10 is opened, backwash fresh water is injected into the filter 15 through the backwashing water injection valve 10 and the valve 12 under the action of the water pump 11 to backwash the filter 15 in order to further flush the dirt off the mesh of the filter 15.

Below further describes an online cleaning method for cleaning a ship ballast water treatment filter using the online cleaning device of the filter of the present invention. The method comprises at least the following steps:

Step S1: preparing the cleaning liquid. Fresh water is added to the cleaning liquid preparation tank 3 through the fresh water inlet 2 until the stirring blades 7 are submerged. The stirring electric motor 4 is started up. According to the formula of the cleaning liquid, the weighed hydrochloric acid is slowly added to the cleaning liquid preparation tank 3 through the drug adding opening 6. After being mixed evenly, fresh water is added to the cleaning liquid preparation tank 3 through the fresh water inlet 2 to the preset volume, followed by adding in turns the weighed hexamethylene tetramine, polyacrylic acid, polyaspartic acid, sodium dodecyl sulfonate, and sodium gluconate which dissolve fully and mix evenly.

Step S2: turning on the filter drain valve 18 and draining the filter 15 as empty as possible.

Step S3: turning off the filter inlet valve 13, filter outlet valve 22 and the filter drain valve 18. Opening the valves 9 and 12 in the cleaning liquid injection valve pipeline 29 and turning on the water pump 11, so that the cleaning liquid is injected into the filter 15 through the cleaning liquid injection pipeline 29. When the filter 15 is full, the water pump 11 is turned off and the valve 9 is closed.

Step S4: soaking for 5-10 minutes so that a full reaction happens between the cleaning liquid and the dirt inside the filter 15.

Step S5: opening the valve 20 in the cleaning fluid reinjection pipeline 30 and starting the water pump 21 so that the cleaning liquid in the filter 15 flows back into the cleaning liquid preparation tank 3 through the cleaning liquid reinjection pipeline 30 so as to be reused.

Step S6: turning on the backwash water injection valve 10 and the water pump 11 to allow backwash fresh water to be injected into the filter 15 through the backwash water injection valve 10 and valve 12 and backwashing for 1-2 minutes.

Step S7: if the filter 15 is blocked seriously, repeating steps S2-S5 to enhance cleaning effect.

In summary, the present invention has at least the following beneficial effects:

(1) the formula of the cleaning liquid adopted by the present invention being simple and easy to be prepared.

(2) through adding the filter cleaning pipeline and the cleaning liquid preparation tank in existing ballast water main pipeline, online cleaning with high efficiency, low cost and good effect being realized without the need for disassembling the filter.

the cleaning process of the present invention having little damage to the filter, and having no damage and corrosion to the coating of the filter mesh and the filter case.

(4) the cleaning method of the present invention being simple and easy to implement.

Specific embodiments are shown below to verify the beneficial effects of the present invention.

Embodiment 1

In the prepared cleaning liquid, the molar concentration of hydrochloric acid is 6.0 mol/L, the quantity-to-volume ratio of the hexamethylene tetramine is 2.5 g/L, the quantity-to-volume ratio of polyacrylic acid is 16.0 g/L, the quantity-to-volume ratio of the polyaspartic acid is 8.5 g/L, the quantity-to-volume ratio of sodium dodecyl sulfate is 0.8 g/L, and the quantity-to-volume ratio of sodium gluconate is 6.5 g/L. Specifically, when preparing the cleaning liquid, fresh water is added to the cleaning liquid preparation tank 3 through the fresh water inlet 2 until the stirring blades 7 are submerged. The volume of the water is about 100 L. The stirring electric motor 4 is started. Through the drug adding opening 6, the weighed HCl (molar concentration=12 mol/L) 125 L is slowly and evenly added into the cleaning liquid preparation tank 3. After all the hydrochloric acid has been added, fresh water is slowly added into the cleaning liquid preparation tank 3 through the fresh water inlet 2 to cause the total volume of the liquid to be 250 L. After stirring the liquid evenly, 625 g hexamethylene tetramine, 4000 g polyacrylic acid, 2125 g polyaspartic acid, 200 g sodium dodecyl sulfate, and 1625 g sodium gluconate are added into the cleaning liquid preparation tank 3 in turns and the liquid is stirred to cause the drugs to dissolve fully and be mixed evenly.

Before cleaning the filter 15, the filter drain valve 18 is turned on to drain the filter 15 as empty as possible.

Closing the filter inlet valve 13, the water outlet valve 22 and the filter drain valve 18, opening the valves 9 and 12 of the cleaning liquid injection pipeline 29, and turning on the water pump 11 so that the cleaning liquid is injected into the filter 15 through the cleaning liquid injection pipeline 29. When the filter 15 is full, turning off the water pump 11 and closing the valve 9.

Soaking for 10 minutes.

Opening the valve 20 in the cleaning liquid reinjection pipeline 30 and starting up the water pump 21 so that the cleaning liquid in the filter 15 is re-injected into the cleaning liquid preparation tank 3 through the cleaning liquid reinjection pipeline 30 so as to be reused.

Opening the backwash water injection valve 10 and starting the water pump 11 to cause backwash fresh water to be injected into the filter 15 through the backwashing water injection valve 10 and valve 12 and backwash the filter 15 for one minute.

With this method, a 40 um filter of a ship ballast water management system which is used for half year, is cleaned. Before cleaning, the pressure of the inlet and outlet of the filter is 0.8 bar. After cleaning, ongoing a press test, the pressure of the filter water inlet 14 and the filter water outlet 19 is less than 0.1 bar. Regeneration of the filter 15 is good.

The cleaned mesh viewed microscopically is bright and free of corrosion. The surface of the case is well coated without bubbling or breakage.

Embodiment Two

In the prepared cleaning liquid, the molar concentration of hydrochloric acid is 4.0 mol/L, the quantity-to-volume ratio of the hexamethylene tetramine is 2.0 g/L, the quantity-to-volume ratio of polyacrylic acid is 20.0 g/L, the quantity-to-volume ratio of the polyaspartic acid is 10.0 g/L, the quantity-to-volume ratio of sodium dodecyl sulfate is 1.0 g/L, and the quantity-to-volume ratio of sodium gluconate is 5.0 g/L. Specifically, when preparing the cleaning liquid, fresh water is added to the cleaning liquid preparation tank 3 through the fresh water inlet 2 until the stirring blades 7 are submerged. The volume of the water is about 150 L. The stirring electric motor 4 is started. Through the drug adding opening 6, the weighed HCl (molar concentration=12 mol/L) 100 L is added into the cleaning liquid preparation tank 3. After all the hydrochloric acid has been added, fresh water is slowly added into the cleaning liquid preparation tank 3 through the fresh water inlet 2 to cause the total volume of the liquid to be 300 L. After stirring evenly, 600 g hexamethylene tetramine, 6000 g polyacrylic acid, 3000 g polyaspartic acid, 300 g sodium dodecyl sulfate, and 1500 g sodium gluconate are added into the cleaning liquid preparation tank 3 in turns and the liquid is stirred to cause the drug to dissolve fully and be mixed evenly.

Before cleaning the filter 15, the filter drain valve 18 is turned on to drain the filter 15 as empty as possible.

Closing the filter inlet valve 13, the water outlet valve 22 and the filter drain valve 18, opening the valves 9 and 12 in the cleaning liquid injection pipeline 29, and turning on the water pump 11 so that the cleaning liquid is injected into the filter 15 through the cleaning liquid injection pipeline 29. When the filter 15 is full, turning off the water pump 11 and closing the valve 9.

Soaking for 5 minutes.

Opening the valve 20 of the cleaning liquid reinjection pipeline 30 and starting up the water pump 21 so that the cleaning liquid in the filter 15 is re-injected into the cleaning liquid preparation tank 3 through the cleaning liquid reinjection pipeline 30 so as to be reused.

Opening the backwash water injection valve 10 and starting the water pump 11 to cause backwash fresh water to be injected into the filter 15 through the backwashing water injection valve 10 and valve 12 and backwash the filter 15 for two minutes.

With this method, a 50 um filter of a ship ballast water management system which is used for half year, is cleaned. Before cleaning, the pressure of the inlet and outlet of the filter is 0.7 bar. After cleaning, ongoing a press test, the pressure of the filter water inlet 14 and the filter water outlet 19 is less than 0.1 bar. Regeneration of the filter 15 is good.

Embodiment Three

In the prepared cleaning liquid, the molar concentration of hydrochloric acid is 5.0 mol/L, the quantity-to-volume ratio of the hexamethylene tetramine is 1.5 g/L, the quantity-to-volume ratio of polyacrylic acid is 15.0 g/L, the quantity-to-volume ratio of the polyaspartic acid is 5.0 g/L, the quantity-to-volume ratio of sodium dodecyl sulfate is 1.2 g/L, and the quantity-to-volume ratio of sodium gluconate is 4.0 g/L. Specifically, when preparing the cleaning liquid, fresh water is added to the cleaning liquid preparation tank 3 through the fresh water inlet 2 until the stirring blades 7 are submerged. The volume of the water is about 100 L. The stirring electric motor 4 is started. Through the drug adding opening 6, the weighed HCl (molar concentration=12 mol/L) 125 L is added into the cleaning liquid preparation tank 3. After all the hydrochloric acid has been added, fresh water is slowly added into the cleaning liquid preparation tank 3 through the fresh water inlet 2 to cause the total volume of the liquid to be 300 L. After stirring evenly, 450 g hexamethylene tetramine, 4500 g polyacrylic acid, 1500 g polyaspartic acid, 360 g sodium dodecyl sulfate, and 1200 g sodium gluconate are added into the cleaning liquid preparation tank 3 in turns and the liquid is stirred to cause the drug to dissolve fully and be mixed evenly.

Before cleaning the filter 15, the filter drain valve 18 is turned on to drain the filter 15 as empty as possible.

Closing the filter inlet valve 13, the water outlet valve 22 and the filter drain valve 18, opening the valves 9 and 12 of the cleaning liquid injection pipeline 29, and turning on the water pump 11 so that the cleaning liquid is injected into the filter 15 through the cleaning liquid injection pipeline 29. When the filter 15 is full, turning off the water pump 11 and closing the valve 9.

Soaking for 7 minutes.

Opening the valve 20 of the cleaning liquid reinjection pipeline 30 and starting up the water pump 21 so that the cleaning liquid in the filter 15 is re-injected into the cleaning liquid preparation tank 3 through the cleaning liquid reinjection pipeline 30 so as to be reused.

Opening the backwash water injection valve 10 and starting the water pump 11 to cause backwash fresh water to be injected into the filter 15 through the backwashing water injection valve 10 and valve 12 and backwash the filter 15 for one minute.

With this method, a 40 um filter of a ship ballast water management system which is used for one year, is cleaned. Before cleaning, the pressure of the inlet and outlet of the filter is 0.8 bar. After cleaning, ongoing a press test, the pressure of the filter water inlet 14 and the filter water outlet 19 is less than 0.1 bar. Regeneration of the filter 15 is good.

The above is just the embodiment of the invention, not any restrictions on the form of the invention, although the invention has been provided with an example above, but not to limit the invention, familiar with any technical personnel in the field, in the technical scheme of the invention can be used when the range these reveal the technical content to make a change or modified to change the equivalent examples, but not out of the technical scheme of the invention, according to any simple modification, equivalent change and modification technology of the essence of the invention for the above examples, are still belongs to the technical scheme of the invention.

INDUSTRIAL APPLICABILITY

The present invention adds the filter cleaning pipeline and the cleaning liquid preparation tank in existing ballast water main pipeline. Through the filter cleaning pipeline, the cleaning liquid prepared in the cleaning liquid preparation tank is injected into the filter and re-injected back to the cleaning liquid preparation tank after soaking for a predetermined period of time, so as to realize online cleaning the filter without disassembling the filter. The online cleaning has a high cleaning efficiency, low cost and good effect. The cleaning process has little damage to the filter and no damage and corrosion to the coating of the filter mesh and the filter case. The cleaning method is simple and easy to implement. Moreover, the formulation of the cleaning liquid of the present invention is simple and easy to be prepared.

What is claimed is:

1. An online cleaning device for a ship ballast water treatment filter, wherein the online cleaning device comprises:
   a filter comprising a stainless steel mesh, a filter water inlet from which ballast water enters the filter, and a filter water outlet from which the ballast water leaves the filter, the filter water inlet being connected with a filter water inlet pipe, the filter water outlet being connected with a filter water outlet pipe, the filter water inlet pipe and the filter water outlet pipe being parts of ballast water main pipeline;
   a filter cleaning pipeline; and
   a cleaning liquid preparation tank located in the filter cleaning pipeline, the cleaning liquid preparation tank comprising a cleaning liquid outlet and a cleaning liquid reinjection opening, the filter cleaning pipeline comprising a cleaning liquid injection pipeline arranged between the cleaning liquid outlet of the cleaning liquid preparation tank and the filter water inlet pipe for introducing cleaning liquid prepared in the cleaning liquid preparation tank to the filter, and a cleaning liquid reinjection pipeline arranged between the filter water outlet pipe and the cleaning liquid reinjection opening of the cleaning liquid preparation tank for reinjecting cleaning liquid from the filter to the cleaning liquid preparation tank;

the filter further comprising a gas water separating valve at a top thereof.

2. The online cleaning device for a ship ballast water treatment filter of claim 1, wherein the cleaning liquid prepared in the cleaning liquid preparation tank comprises hydrochloric acid with a molar concentration of 3.2-6.4 mol/L, hexamethylene tetramine with a quantity-to-volume ratio of 1.3-4.0 g/L, polyacrylic acid with a quantity-to-volume ratio of 13.0-33.5 g/L, polyaspartic acid with a quantity-to-volume ratio of 3.0-13.5 g/L, sodium dodecyl sulfate with a quantity-to-volume ratio of 0.6-2.0 g/L, and sodium gluconate with a quantity-to-volume ratio of 3.0-10.0 g/L.

3. The online cleaning device for a ship ballast water treatment filter of claim 1, wherein the filter water inlet pipe is provided with a filter water inlet valve, a connection between the cleaning liquid injection pipe and the filter water inlet pipe is located at downstream of the filter water inlet valve;

the filter water outlet pipe is provided with a filter water outlet valve, a connection between the cleaning liquid reinjection pipeline and the filter water outlet pipe is located at upstream of the filter water outlet valve.

4. The online cleaning device for a ship ballast water treatment filter of claim 1, wherein the cleaning liquid injection pipe is provided with a first valve and a second valve located at downstream of the first valve;

a water pump is arranged between the first valve and the second valve;

the backwash water injection pipe is arranged between the first valve and the water pump;

the backwash water injection pipe is provided with a backwash water injection valve.

5. The online cleaning device for a ship ballast water treatment filter of claim 3, wherein the cleaning liquid reinjection pipeline is provided with a third valve and a water pump located at downstream of the third valve.

6. The online cleaning device for a ship ballast water treatment filter of claim 1, wherein the cleaning liquid preparation tank is provided with a stirring electric motor and a stirring shaft and stirring blades connected with the electric motor.

7. The online cleaning device for a ship ballast water treatment filter of claim 1, wherein the cleaning liquid outlet is disposed at a bottom of the cleaning liquid preparation tank and the cleaning liquid reinjection opening is disposed at an upper side corner of the cleaning liquid preparation tank.

8. The online cleaning device for a ship ballast water treatment filter of claim 1, wherein the cleaning liquid preparation tank further comprises a fresh water inlet and a drug adding opening at a top thereof.

9. The online cleaning device for a ship ballast water treatment filter of claim 1, wherein the filter further comprises an electric motor for backwashing of the filter.

10. The online cleaning device for a ship ballast water treatment filter of claim 1, wherein the filter further comprises a filter sewage outfall at a bottom thereof, the filter sewage outfall is connected with a filter sewage outfall pipe and a filter drain valve is disposed in the filter sewage outfall pipe.

11. The online cleaning device for a ship ballast water treatment filter of claim 1, wherein the filter water inlet and the filter water outlet are disposed at a bottom of the filter.

12. The online cleaning device for a ship ballast water treatment filter of claim 1, wherein a backwash water injection pipe is connected with the cleaning liquid injection pipeline.

13. The online cleaning device for a ship ballast water treatment filter of claim 1, wherein the filter further comprises a case made of carbon steel coated with epoxy anticorrosive coating, the stainless steel mesh is disposed in the case with mesh sizes being tens of microns.

* * * * *